United States Patent [19]
Belikov et al.

[11] 4,420,712
[45] Dec. 13, 1983

[54] ELECTRIC DRIVE FOR SYNCHRONOUS DISPLACEMENT OF MECHANICALLY INDEPENDENT MACHINE ASSEMBLIES MOVING ALONG EQUIDISTANT TRAJECTORIES

[75] Inventors: Viktor T. Belikov; Anatoly D. Ivlev; Valentin M. Sitnichenko; Vladimir I. Shvets; Leonid V. Bushtian, all of Odessa, U.S.S.R.

[73] Assignee: Odessky Ordena Trudovogo Kraskogo, Odessa, U.S.S.R.

[21] Appl. No.: 329,280

[22] PCT Filed: Apr. 10, 1981

[86] PCT No.: PCT/SU81/00032
§ 371 Date: Dec. 7, 1981
§ 102(e) Date: Dec. 7, 1981

[87] PCT Pub. No.: WO81/03092
PCT Pub. Date: Oct. 29, 1981

[30] Foreign Application Priority Data

Apr. 19, 1980 [SU] U.S.S.R. ............................. 2912668

[51] Int. Cl.³ .......................................... H02K 41/03
[52] U.S. Cl. ...................................... 318/41; 318/135; 318/38; 310/12
[58] Field of Search ................... 318/38, 41, 85, 135; 310/33, 22, 12

[56] References Cited

U.S. PATENT DOCUMENTS 4,151,447  4/1979  von der Heide et al. ............ 310/12
4,249,114  2/1981  Popov et al. ........................ 310/13
4,348,618  9/1982  Nakamura et al. .................. 318/38

*Primary Examiner*—J. V. Truhe
*Assistant Examiner*—A. Evans
*Attorney, Agent, or Firm*—Holman & Stern

[57] ABSTRACT

An electric drive includes two d.c. electric motors electrically connected therebetween, each of them comprising a stationary former of magnetic field, a movable portion 1,2, an excitation winding 3,4, and an armature winding 5. A commutating device 25 is connected to the armature winding 5. The former of magnetic field is a ferromagnetic strip 22 or 23 provided with pole-forming projections disposed in two rows in the chessboard order. The armature winding 5 is common for both the motors, its sections being uniformly distributed among the motors, and the ends of the sections are led out at the side of one of the motors and connected to the commutating device 25 for forced commutation of the sections in a function of a relative location of the ferromagnetic modules of the movable portions and pole-forming projections.

3 Claims, 5 Drawing Figures

ELECTRIC DRIVE FOR SYNCHRONOUS DISPLACEMENT OF MECHANICALLY INDEPENDENT MACHINE ASSEMBLIES MOVING ALONG EQUIDISTANT TRAJECTORIES

TECHNICAL FIELD

The present invention relates to an electric drive, and particularly concerns an electric drive for synchronous displacement of mechanically independent machine assemblies moving along equidistant trajectories. Hereinafter the term "mechanically independent machine assemblies" also means such running parts of a machine, the mechanical connection between which can be neglected due to its insufficient rigidity.

BACKGROUND ART

An important requirement to the electric drive of the above type consists in the maintenance of synchronism of displacement of suporting members moving along equidistant trajectories. Numerous attempts to meet this requirement are known.

Thus, known in the art are electric drives for synchronous rotation of mechanically independent shafts (M. G. Chilikin et al. "Teoriya avtomatizirovannogo elektroprivoda"—"Theory of automated electric drive", Moscow, "Energiya", 1979, pp. 538-557). In the above electric drives each shaft is mechanically coupled with a separate synchronous or asynchronous electric motor. Windings of rotors of these motors are electrically connected therebetween.

In the case of a lag of one of the shafts, which would result in the angular deflection of the supporting members, a corresponding motor produces an additional torque to eliminate misalignment, and consequently to a certain degree prevent the angular deflection of the supporting members.

Among the above specified electric drives, the most typical is an electric drive including two d.c. electric motors located equidistantly and electrically connected therebetween (V. P. Andreev, Yu. A. Sabinin. "Osnovy elektroprivoda"-"Fundamentals of electric drives", Moscow-Leningrad, Gosenergoizdat, 1963, pp. 674-675). Each of these motors includes a stationary former of magnetic field, a movable portion disposed within this magnetic field, an excitation winding, a sectionalized armature winding, and a collector with brushes, commutating the sections of the armature winding.

To synchronize the rotation, d.c. electric motors are provided with additional contact rings whereto are connected three symmetric points of the armature winding, shifted relatively one another by 120 electrical degrees. The rings of these motors are electrically connected therebetween. From the viewpoint of the contact rings, said electrical machines operate like placed-in-parallel synchronous generators. In the case of occurrence of a misalignment, a circulating current starts flowing over the armature windings, due to which fact there occur synchronizing torques retaining the machines in the synchronous rotation mode. However, these torques decrease with decreasing speed of rotation of the armatures. The speeds of rotation of the armatures being low, when the electromotive force induced in the armature windings is practically equal to zero, the synchronizing torques also practically vanish, which fact makes inexpedient the use of such an electric drive for shifting lengthy gantries of e.g. thermal cutting machines, where in the displacements at very low speeds, of the order of tens of millimeters per minute, the main processing operation modes are practiced.

DISCLOSURE OF INVENTION

The invention is directed to the provision of an electric drive for synchronous displacement of mechanically independent machine assemblies moving along equidistant trajectories, which, due to the change in the concept of designing the electric motor, ensures an increase in the synchronism of shifting mechanically independent assemblies of processing machines, and consequently elimination of their angular deflection in the course of shifting.

The object set forth is attained by that in an electric drive for synchronous displacement of mechanically independent machine assemblies, comprising at least two d.c. electric motors electrically connected therebetween, each including a stationary former of magnetic field, a movable portion located within the zone of action of this magnetic field, an excitation winding, active conductors of sections of an armature winding, and a commutating device connected to the armature winding, according to the invention, each former of magnetic field is a ferromagnetic strip provided with pole-forming projections disposed in two rows along the shifting direction, the pole-forming projections of one row being shifted relative to the pole-forming projections of another row, the movable portion of each motor is a ferromagnetic module carrying the excitation winding and the active conductors of the armature winding whose sections are uniformly distributed among the motors, the conductors of the armature winding accomplish electrical connection between the motors, and the ends of sections thereof, led out at the side of one of the motors, are connected to the commutating device for forced commutation of these sections in a function of a relative location of the ferromagnetic modules and the pole-forming projections of corresponding formers of magnetic field.

The utilization of the proposed d.c. electric motor in the inventive electric drive provides for the possibility of setting the degree of synchronism of displacement of mechanically independent assemblies of a machine in the process of constructing the electric drive. The predetermined degree of synchronism of displacement is practically ensured by a forced commutation of currents in that portion of active armature conductors, which is located on the ferromagnetic module of one motor, depending on signals produced by a position pickup or on the location of an electromechanical collector, disposed on the module of another motor. The term "ferromagnetic module" means hereinafter a body made from a ferromagnetic material, provided with grooves in which is laid an excitation winding, and with grooves in which are laid active conductors of the armature winding. The shape of this body is adapted for shifting same over a predetermined trajectory along the pole-forming projections of the ferromagnetic strip under the action of electromagnetic forces, and for fixing thereon a driven machine assembly.

To increase the effect of synchronization, it is expedient that the electric drive be constructed so that each d.c. electric motor comprise an additional ferromagnetic module similar to the main ferromagnetic module and mechanically connected therewith, the conductors of the armature winding of all the additional ferromagnetic modules be connected to an additional commutating device ensuring, under synchronism, the coincidence of axes and directions of magnetic excitation fluxes, and the armature reaction.

According to this embodiment of the invention, the main ferromagnetic modules develop driving and synchronizing force, and the additional modules are so commutated that they develop no force under synchronism. The appearance of misalignment results directly in the occurrence of a synchronizing electromagnetic force. This is achieved due to such a commutation of the sections of the armature winding, being common for the additional modules, in which axes and directions of the main magnetic excitation fluxes and those of the armature reaction coincide.

To upgrade the effect of synchronization under conditions where it is possible to vary the mechanical resistance against the displacement of any one of the two mechanically independent machine assemblies, it is expedient to construct the drive so that the main ferromagnetic module of one motor and the additional ferromagnetic module of another motor be connected respectively to the main and additional commutating devices to ensure crossed commutation of the motors.

BRIEF DESCRIPTION OF DRAWINGS

The invention is further explained in terms of detailed descriptions of embodiments thereof with reference to the accompanying drawings, in which.

BEST MODE FOR CARRYING OUT THE INVENTION

Figures 1, 2:
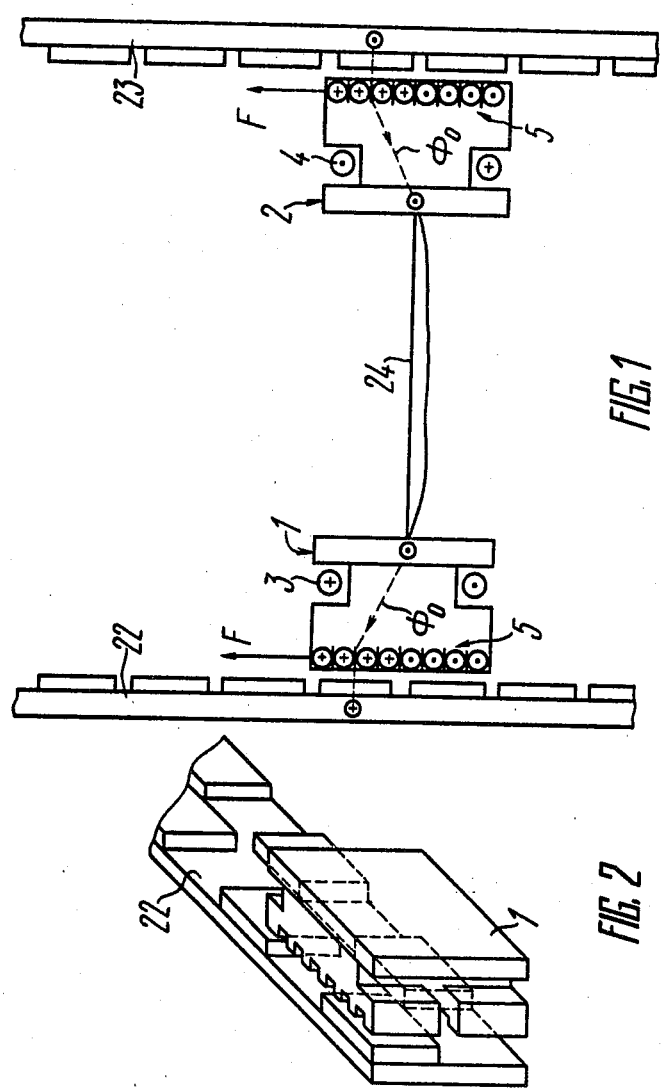
FIG. 1 is a design drawing of the inventive electric drive for synchronous displacement of mechanically independent machine assemblies moving along equidistant trajectories.
FIG. 2 is a spatial mutual location of a former of magnetic field and a ferromagnetic module of the inventive electric drive.

Referring to FIG. 1, a ferromagnetic module (movable portion) 1, 2 of each motor carries an excitation winding 3,4 respectively, and active conductors of an armature winding 5. For the convenience of the following description of operation of the inventive electric drive, it is shown in this fugure that a portion of the armature winding 5, disposed in the left-hand motor, has conductors 6, 7, 8, 9, 10, 11, 12, and 13 (FIG. 3), and another portion of this winding, disposed in the right-hand motor, has conductors 14, 15, 16, 17, 18, 19, 20, and 21. A stationary former of a field of each motor includes a ferromagnetic strip 22 or 23 (FIG. 1), whose pole-forming projections are disposed in two rows in the chessboard order (see also FIG. 2). Sections of the armature winding 5 are uniformly distributed among the ferromagnetic modules 1 and 2, and their conductors are electrically connected therebetween by means of a cable 24 (FIG. 1).

Figure 3:
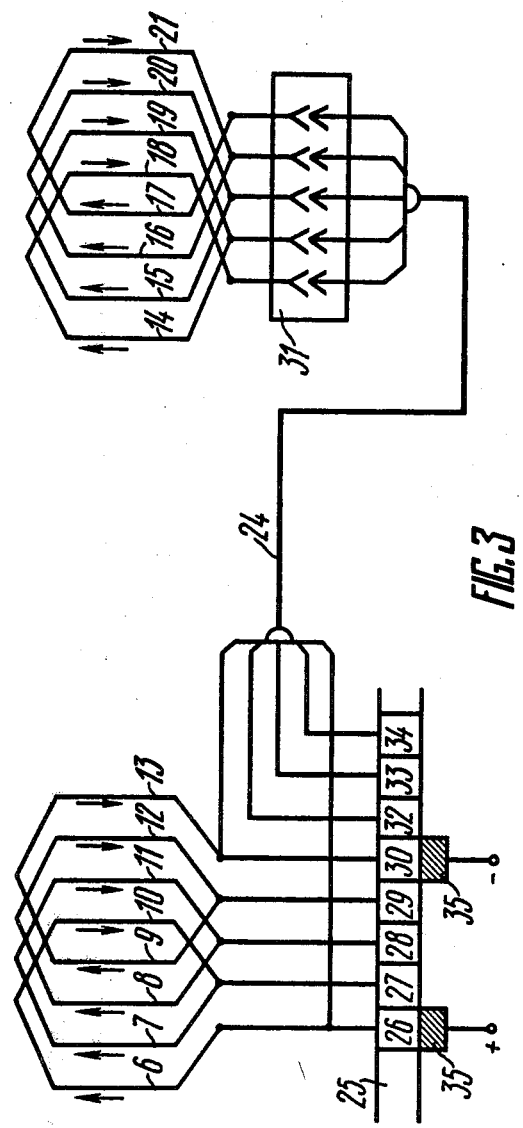
FIG. 3 is a circuit diagram of the armature winding, of the invention.

FIG. 3 illustrates a circuit diagram of the active conductors of the armature winding 5, disposed on both ferromagnetic modules. The diagram shows the connection of the conductors in accordance with the principle of a well known single-layer armature winding of the d.c. linear electric motor, where a portion of the winding, laid on the ferromagnetic module 1, is constructed as a portion of a non-crossed winding, while a portion of the armature winding, laid on the module 2 is a crossed winding. A special two-layer armature winding may be utilized as well (e.g. USSR Author's Certificate No. 480,155).

In the utilization of e.g. a linear or drum electromechanical collector 25, the armature winding 5 of the motor is formed on the module 1 as follows. Sections of the armature winding 5 on the module 1, formed by the active conductors 6, 7, 8, 9, 10, 11, 12, and 13, are connected directly to commutator bars 26, 27, 28, 29, and 30. Sections of the armature winding 5 on the module 2, formed by the active conductors 14, 15, 16, 17, 18, 19, 20, and 21 are connected through a connector assembly 31 and the cable 24 to the commutator bars 26, 30, 32, 33, and 34. Supply voltage is applied to the armature winding 4 through brushes 35.

The utilization of the above described modification of the inventive motor is the most effective in the application of removal of a mechanical resistance force from that machine assembly whereto the electromechanical collector 25 is rigidly connected. This is caused by the fact that a rate of commutation of the sections of the armature winding 5 on the module 2 is determined by the module 1 which takes load impulses. In the case where these impulses start effecting the module 2, the reversal of the sections of the armature winding 5 on this module to the sections of the armature winding 5 on the module 1 is less than in the preceding case due to a rigid fastening of the collector on the module 1 which does not undergo load impulses.

Figure 4:
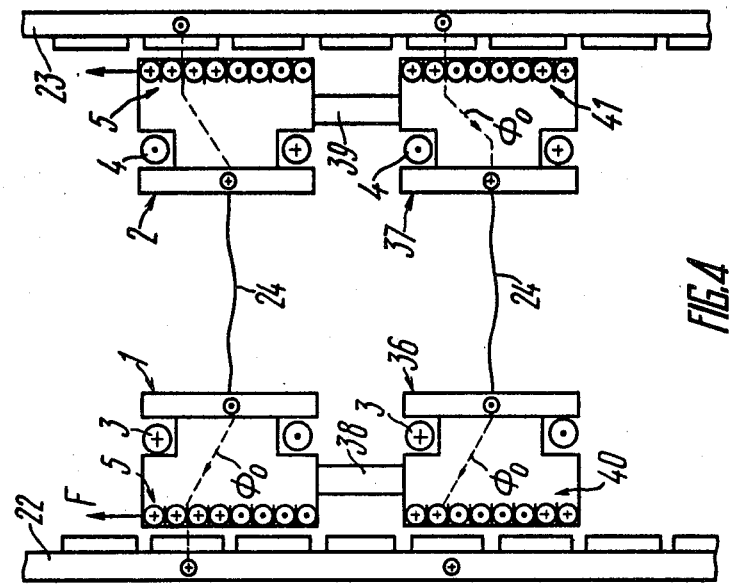
FIG. 4 is a design drawing of another embodiment of the inventive electric drive.

An additional synchronization effect is achieved in the utilization of a design of the electric drive, illustrated in FIG. 4. In this figure, the module 1 is mechanically rigidly connected with a module 36, and the module 2 is connected to a module 37 by means of corresponding connecting elements 38 and 39. Portions 40 and 41 of the armature winding of these modules are connected to the electromechanical collector (not shown).

Figure 5:
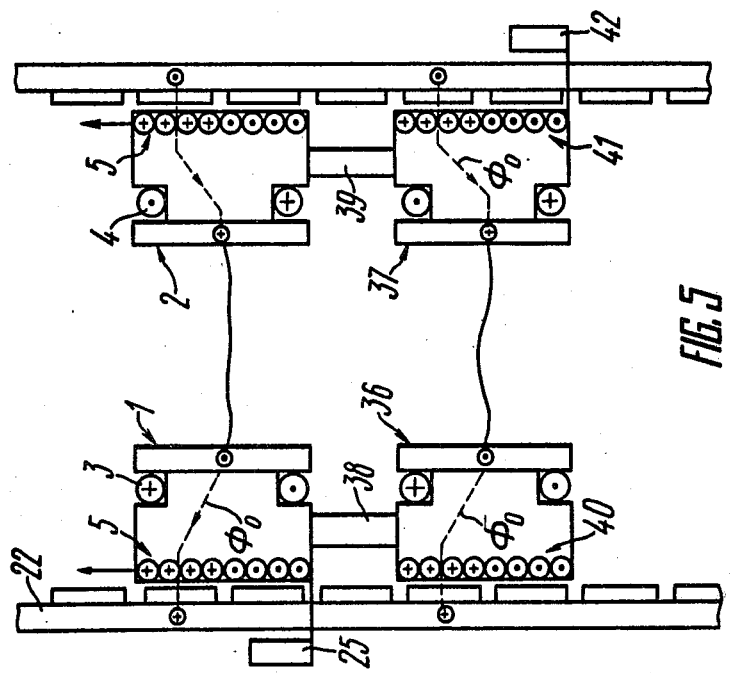
FIG. 5 is a design diagram of still another embodiment of the inventive electric drive.

A further intensification of the synchronization effect is achieved in the utilization of a modification of the electric drive, illustrated in FIG. 5. This modification of the inventive electric drive differs from that shown in FIG. 4 in that the electromechanical collectors 25 and 42 are rigidly connected with the modules 1 and 37 respectively, i.e. in a crossed manner.

The above described electric drive operates as follows (FIG. 1).

When supplying power to the excitation windings 3,4 of the modules 1 and 2, main magnetic fluxes $\phi_o$ are created, closing through upper and lower magnetic circuits of the module 1 and the former 22 of magnetic field, and through upper and lower magnetic circuits of the module 2 and the former 23 of magnetic field. In the flow of armature currents through the conductors 6, 7, 8, 9, 10, 11, 12, and 13 and through the conductors 14, 15, 16, 17, 18, 19, 20, and 21 in the directions shown in FIG. 1, the modules 1 and 2 develop electromagnetic forces F shifting these modules in a required direction. The electromechanical collector 25 (FIG. 3) or a semiconductor commutator corresponding thereto accomplishes switching the active conductors of the armature winding from one parallel branch to another so that the directions of both electromagnetic forces do not change. In so doing, the parallel branches are alternatively formed by the conductors of both the modules, due to which fact they move synchronously. Moving forces F are at the same time synchronizing ones. Reversing and regulating the speed are carried out by methods which are common for the d.c. electric motors.

In the case where the module 1, rigidly connected with the collector 25, slows down or accelerates, the forced commutation of the sections of the module 2 changes respectively, which module is thus synchronized with the module 1 since a certain mutual location of the module and the field former corresponds to a certain order of commutation, and vice versa.

According to a modification of the inventive electric drive, illustrated in FIG. 4, the portions 40 and 41 of the armature winding are commutated by the semi-conductor commutator or the electromechanical collector so that axes and directions of magnetic fluxes of the armature and those of excitation coincide, i.e. that in the absence of misalignment the armature windings of the modules 36 and 37 develop a purely longitudinal magnetizing reaction of the armature. As follows from the theory of electric machines, in this case any perturbing effect tending to withdraw the armature of a d.c. electric machine from this position, results in the appearance of an electro-magnetic force returning the armature to the starting position after the perturbing effect has been removed, i.e. there appears a synchronizing effect which supplements the main one developed by the modules 1 and 2 having such a commutation in which the axes of magnetic fluxes of excitation and armature reaction are in quadrature.

Thus, the design of the inventive electric drive, illustrated in FIG. 4, materializes the possibility of precision synchronization of displacing, e.g. supporting members of lengthy gantries of machines.

In the embodiment of the inventive electric drive, shown in FIG. 5, the synchronization effect becomes apparent irrespectively from the location of appearance of oscillations in the force of mechanical resistance, since in the load impulses being undergone, e.g. by the left-hand motor, the module 2 of the right-hand motor is compulsory commutated by the collector 25, while in the case where similar impulses are undergone by the right-hand motor, the module 36 is compulsory commutated by the collector 42.

INDUSTRIAL APPLICABILITY

The invention can be used as an electric drive for synchronous displacement of at least two movable supporting members along equidistant trajectories, e.g. of the span ends of wide-span machines designed for arc welding, thermal cutting, and of supporting members of load lifting devices. Of considerable interest is the utilization of the invention in cargo handling equipment of lengthy container terminals and other mechanisms in which a mechanical connection is practically absent due to certain design considerations.

We claim:

1. An electric drive for synchronous displacement of mechanically independent machine assemblies moving along equidistant trajectories, comprising at least two d.c. electric motors electrically connected to one another, each including a stationary former of magnetic field, a movable portion located within the zone of action of this magnetic field, an excitation winding and conductors of sections of an armature winding, and a commutating device connected to the armature winding sections, characterized in that each former of magnetic field is a ferromagnetic strip provided with pole-forming projections disposed in two rows along the displacement direction, the pole-forming projections of one row being shifted relative to the pole-forming projections of another row, the movable portion of each motor is a ferromagnetic module carrying the excitation winding and conductors of the armature winding, the conductors of the armature winding accomplish electrical connection between the motors, and the ends of sections thereof, terminated at the side of one of the motors, are connected to the commutating device for forced commutation of these sections as a function of a relative location of the ferromagnetic modules and the pole-forming projections of corresponding formers of magnetic field.

2. An electric drive as set forth in claim 1, characterized in that each d.c. electric motor comprises an additional ferromagnetic module mechanically connected with the main ferromagnetic module, the conductors of the armature winding of all the additional ferromagnetic modules are connected to an additional commutating device ensuring, under synchronism, the coincidence of axes and directions of magnetic excitation fluxes, and the armature reaction.

3. An electric drive as set forth in claim 2, characterized in that the main ferromagnetic module of one motor and an additional ferromagnetic module of another motor are connected respectively to the main and additional commutating devices to provide crossed commutation of the motors.

* * * * *